F. DINGHAUS.
WATER PURIFIER.
APPLICATION FILED DEC. 15, 1909.
963,529.
Patented July 5, 1910.
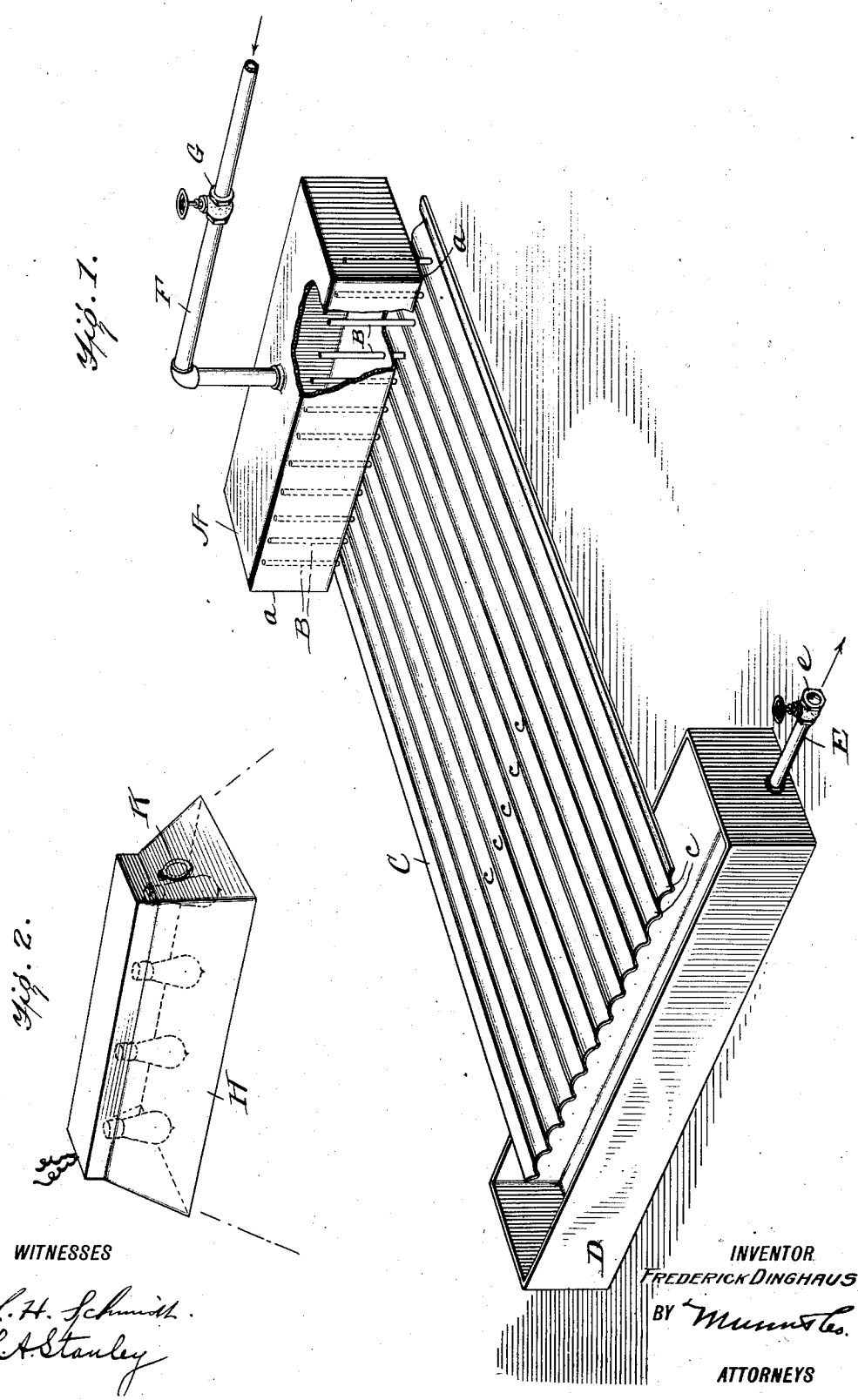
WITNESSES
L. H. Schmidt.
L. A. Stanley
INVENTOR
FREDERICK DINGHAUS,
BY Munn & Co.
ATTORNEYS

UNITED STATES PATENT OFFICE.

FREDERICK DINGHAUS, OF PUERTO BARRIOS, GUATEMALA.

WATER-PURIFIER.

963,529.      Specification of Letters Patent.      Patented July 5, 1910.

Application filed December 15, 1909. Serial No. 533,262.

*To all whom it may concern:*

Be it known that I, FREDERICK DINGHAUS, a citizen of the United States, and resident of the city of Puerto Barrios, in the Republic of Guatemala, Central America, have invented certain new and useful Improvements in Water-Purifiers, of which the following is a specification.

My invention relates to improvements for removing impurities such as lime and sediment from water, especially from water which is designed to be used subsequently in a boiler for producing steam, and it consists in the combinations, constructions and arrangements of parts herein described and claimed.

An object of my invention is, as stated above to remove lime and sediment from water and I make use of rays of light for accomplishing this purpose in connection with the simple apparatus herein described.

A further object of my invention is to provide an apparatus through which the water may be continuously flowing, thereby obviating the necessity of stopping the flow in order to remove the sediment from the apparatus as is common with some devices having for their objects the purification of water by the precipitation of the heavier matter.

Further objects and advantages will appear in the following specification and the novel features of the device will be particularly pointed out in the appended claims.

My invention is illustrated in the accompanying drawings in which,

Figure 1 is a perspective view of my invention, and Fig. 2 is a view of the reflector constituting a modified form of the device.

In carrying out my invention, I provide an upper receptacle A, which may be made of iron, tin, wood, or other suitable material, and which has extending through its bottom a series of vertical tubes B. These tubes, as is shown in the drawing, terminate near the top of the box A at their upper ends, while their lower ends project through the box.

Disposed underneath the forward edge $a$ of the box A is an inclined plate C. This plate is preferably made of aluminum and has corrugations $c$ running lengthwise of the plate. Each trough of the corrugated surface has one of the tubes B immediately above it, the purpose of the tubes B being to spread out the water evenly upon the aluminum sheet C. At the lower end of the aluminum sheet is a second receptacle D which is arranged to receive the water as it flows off from the sheet and this receptacle is provided with an outlet E provided with a cock $e$ which leads to the feed water reservoir, (not shown.)

The receptacle A is supplied by means of the pipe F which has a cock G by which the flow of water may be regulated.

From the foregoing description of the various parts of the device, the operation thereof may be readily understood.

The water containing the lime or impurities such as sediment is permitted to flow through the pipe F into the receptacle A. This is continued until the water rises to the tops of the tubes B, these tubes being on the same level. The water flows over the edge of the tubes and down upon the plate C, thus being spread out into a thin sheet. The inclination of the plate C must be regulated and this is done by experiment. The plate is placed in such a position that the rays of the sun may fall upon the thin stream of water as it flows from the upper to the lower end.

I have found that the rays of light tend to cause the suspended particles of lime or sediment to cohere, thus forming larger particles, and to precipitate. The particular reason for the cohesion of the particles under the rays of light, I have not fully determined, but experiment has proved that the action takes place so that when the water, after being subjected to the sun's rays, is passed into the reservoir D and thence into the boiler, it settles in the form of mud to the bottom of the latter and does not form an ordinary incrustation on the tubes and sides which is injurious to the boiler and prevents the proper transmission of heat. This mud may be blown off readily at intervals and thus the boiler may be kept free from the injurious effect which follows from the use of water which has not been subjected to the apparatus in the manner described.

In Fig. 2, I have shown a reflector H which may be placed over the sheet C in case the rays of sun are not available. In this reflector may be placed electric lights K, and I have found that these rays will have the same effect in causing the particles of sediment to cohere as the rays of sun. This reflector may be made of tin or other polished metal or glass, the main purpose being to conserve as much of the light-giving rays as possible.

It will be noted that the corrugated sheet is of aluminum. I make this sheet of aluminum for two purposes, one being that it is a good reflector, and instead of absorbing the light rays, reflects them back into the water, thereby increasing the efficiency of the device. Aluminum not being easily oxidized, the reflecting surface is preserved which would not be the case with a metal which was easily rusted or corroded.

The use of this apparatus in the manner above described is particularly efficacious in purifying the water. I have found that a boiler which has been used two months with the water treated by this device is just as clean as when the experiment began.

I claim:

1. A water purifier comprising an upper water receptacle, a series of vertical tubes disposed in said receptacle, the upper ends of said tubes being on a common level, and the lower ends of the tubes projecting through the bottom of the receptacle, an inclined corrugated light reflecting surface disposed beneath said water receptacle, said vertical tubes corresponding in number and arranged to register with the respective corrugations in said light reflecting surface and a lower water receptacle arranged to receive the water from said light reflecting surface.

2. A water purifier comprising an upper water receptacle, a series of vertical tubes disposed in said receptacle, the upper ends of said tubes being on a common level, and the lower ends of the tubes projecting through the bottom of the receptacle, an inclined non-corrosive, metallic light reflecting surface disposed beneath said water receptacle, said tubes corresponding in number and arranged to register with the respective corrugations in said reflecting surface and a lower water receptacle arranged to receive the water from said light reflecting surface.

3. A water purifier comprising an upper water receptacle, means for regulating the admission of water thereto, a row of vertical tubes disposed in said receptacle near one side thereof, the upper ends of said tubes being on a level, and the lower ends of the tubes projecting through the bottom of the receptacle, an inclined corrugated aluminum light reflecting surface having its upper edge disposed beneath the row of tubes, said tubes corresponding in number and arranged to register with the respective corrugations in said aluminum light reflecting surface, a lower water receptacle arranged to receive the water from said light reflecting surface, a source of light and a reflector therefor adapted to be placed above said light reflecting surface.

FREDERICK DINGHAUS.

Witnesses:
DOUGLAS BRADFORD,
N. P. MACPHAIL.